Patented Feb. 20, 1951

2,542,119

UNITED STATES PATENT OFFICE 2,542,119

SEPARATION OF COFFEE AROMA

Hubert M. Cole, Belmar, N. J., assignor to General Foods Corporation, New York, N. Y., a corporation of Delaware No Drawing. Application August 19, 1948,
Serial No. 45,202

11 Claims. (Cl. 99—71)

The present invention relates to a method of producing an improved soluble or "instant" coffee, and more particularly to producing such a product free from the coffee fat without forfeiting the aroma fraction associated therewith and to separating and isolating said aroma fraction.

In the preparation of a coffee infusion a certain amount of fat is generally removed from the ground, roasted coffee. Such fat is present in the infusion to a relatively small extent and while not soluble is sufficiently well suspended and dispersed so as to be an integral part thereof. However, on concentrating and spray drying such an infusion to an instant coffee powder the suspension is broken and apparently the fat is agglomerated to some extent. Accordingly, it often happens that when the consumer reconstitutes the instant coffee he obtains cup coffee having a disagreeable, somewhat milky turbidity.

In dealing with the above detailed problem attempts have been made to remove the fat from the coffee infusion prior to spray drying. Such attempts include filtering the freshly prepared infusion through spent coffee grounds to remove the dispersed coffee fat directly from suspension and also chilling a concentrated infusion to solidify the fat and thus facilitate its separation by filtration. While some improvement has been effected, such methods have not provided a satisfactory solution to the problem, however.

It is possible to eliminate the fat in the instant coffee powder by extracting the ground, roasted coffee with a suitable solvent for the coffee fat or oil. Such solvents are the hydrocarbons such as benzene, toluene, hexane, heptane, octane and the chlorinated hydrocarbons such as $C_2HCl_3$, $C_2Cl_4$, $CCl_4$, $CH_2Cl_2$, $C_2H_4Cl_2$, $C_2H_2Cl_4$ and the like. However, the removal of the coffee fat in this manner also serves to remove the aroma fraction which is associated with such fat. The extraction of this aroma fraction removes an essential ingredient so that the taste characteristics of the resulting coffee product are appreciably altered.

Various attempts have been made to separate the fat and the aroma fraction contained in an extract such as aforementioned. Such attempts include liquid-liquid extraction of the aroma from the fat solvent extract with a polar solvent such as water, methanol, ethanol, acetone and the like. Although this method is capable of separating some of the aroma from the fat, it fails, however, to provide the aroma in a satisfactory form for use in an instant coffee or for various other flavoring purposes such as those detailed hereinbelow. While soluble in the polar solvents the aroma fraction, or at least some of the constituents thereof, is apparently preferentially soluble in the fat solvent extract so that an excessive volume of the polar solvent is required for substantially complete extraction of the aroma. The volume required is such that its addition to a concentrated coffee infusion to be spray dried unduly dilutes said concentrate. On the other hand, concentration of the polar solvent extract or recovery of the aroma therefrom by distillation of such solvent provides an aroma fraction of considerably altered form, apparently due to co-distillation of many of the constituents of the aroma fraction with the polar solvent. Attempts to avoid the disadvantageous preferential solubility of the aroma fraction in the fat solvent extract by distilling the fat solvent and treating the residual oil composed of fat and aroma fraction with a polar solvent have also failed due to the formation of troublesome emulsions.

It has also been attempted to treat the aforementioned residual oil by saponifying the fat content thereof with alkali hydroxides such as NaOH, KOH and the like to convert the same to a water soluble form and permit the extraction of the aroma fraction with a solvent such as hexane, benzene, $CCl_4$ and the like, but this method has also failed, apparently because of alteration of some of the constituents of the aroma fraction by the alkaline treatment.

An object of the present invention is to provide an instant coffee powder which reconstitutes to a cup coffee free from the above described turbidity and containing the full-bodied coffee flavor and aroma.

Another object is to provide an instant coffee powder free from the coffee fat but containing the aroma fraction associated therewith.

Still another object is to provide a method whereby an instant coffee powder free from the coffee fat but containing the aroma fraction associated therewith may be obtained.

A further object is to provide a method whereby the aroma fraction associated with the coffee fat may be isolated and supplied in substantially unaltered form.

A still further object is to accomplish the objects detailed above in an economical manner without resorting to expensive procedures, apparatus and reagents.

These and other objects are accomplished in accordance with the process of the present invention.

It has now been found that the aroma fraction extracted along with the coffee fat when ground, roasted coffee is treated with a fat solvent, as aforementioned, may be separated from the fat by distillation under reduced pressure. Accordingly, a defatted instant coffee product having the full-bodied coffee flavor and aroma may be provided by extracting ground, roasted coffee with a volatile fat solvent removing said solvent by distillation, separating the aroma fraction from the fat by distillation under reduced pressure and incorporating the aroma fraction in the instant coffee. Also, if desired, the separated aroma fraction may be retained and used for other flavoring purposes as detailed more fully hereinafter.

A wide variety of the usual vacuum distillation techniques ranging from the conventional pot distillation to molecular distillation may be employed in separating the aroma fraction from the fat without encountering the difficulties detailed hereinabove in connection with other methods for effecting the separation. The preferred method of distillation under reduced pressure, however, is that involving distillation from a film. While the other methods of distillation under reduced pressure provide the aroma fraction in a condition which is quite satisfactory, distillation from a film provides the aroma fraction in a completely unchanged condition.

The apparatus used in distilling from a film takes the form of numerous embodiments, all of which are characterized, however, by the provision of a heated film of the distilland and an adjacent parallel condensing surface. Such distillation is usually carried out under reduced pressure although such is not always the case. Also, the aforementioned condensing surface is frequently located closely adjacent to the film and if sufficiently close affords a very convenient molecular distillation technique. However, this type of apparatus is also used in solvent stripping operations in which case the condensing surface is located at a distance from the film much greater than the mean molecular path which characterizes the molecular distillation technique. In separating the aroma fraction in accordance with the process of the invention it is not imperative that the distance between the film and condensing surface be so short as to have molecular distillation but the use of reduced pressures is required.

The various embodiments of film distillation apparatus include the falling film type of still which usually comprises two concentric cylinders in which the distilland is caused to flow in a thin film down the outer surface of the inner, heated cylinder, the distilled material is condensed on the inner surface of the outer, cool cylinder, and the space enclosed by said cylinders is maintained under reduced pressure. Other forms of such apparatus include the modification in which a cylindrical piece of metal gauze is inserted between two solid cylindrical surfaces such as those aforementioned, said gauze being maintained at a temperature intermediate between those of the two solid surfaces. A two-stage distillation or fractionation is thus effected. Still another embodiment takes the form of two adjacent parallel disks. The lower of these is revolved at high speed, the distilland being introduced upwardly at the center thereof and thereby spread by centrifugal force outwardly across its surface in a thin film. The undistilled material is collected at the periphery of the revolving disk and the distillate is condensed and collected on the upper disk. In carrying out the process of the present invention it is usually preferred for practical reasons to employ the first of the above described embodiments, namely, the falling film type of still.

The rate at which the aforesaid residual oil should be put through a given falling film still and the film thickness to be employed in connection therewith may be readily determined. The only material precaution that needs to be observed in this connection is to avoid "flooding" which causes splattering of undistilled material onto the condensing surface.

Although the distillation may be carried out over a wide range of temperatures, from the standpoint of the efficiency of the operation it is preferred to distill at a temperature of at least 80° C. Temperatures appreciably below this temperature do not provide an efficient distillation rate even when extremely low pressures are employed. Moreover, when such low temperatures are employed there is, to a small extent, the distillation of a disproportionate share of the more volatile, fugitive constituents of the aroma fraction. On the other hand, distillation should not be carried out at excessively high temperatures. At temperatures appreciably in excess of 150° C. deterioration of the distilled aroma begins to become discernible and for this reason it is preferred to carry out the distillation at temperatures not appreciably in excess of 150° C. While the reduced pressures employed need not be extreme, it is preferred to use the lowest pressure that may be provided by the apparatus available. At a pressure of 2.0 mm. carrying out the distillation at a temperature of 150° C. provides a satisfactory distillation operation while avoiding any deterioration of the distilled aroma. On the other hand, the use of pressures as high as 10 mm. requires a distillation temperature of only about 175° C. in order to provide an adequate distillation rate of aroma fraction of suitable quality.

The following is a detailed example of the manner in which the process of the present invention may be employed to effect the objects and purposes detailed hereinabove:

27.5 lbs. of ground, roasted coffee in a 60 l. tank were extracted with 22 l. of ethylene dichloride by allowing the mixture to stand over night. The solvent extract was separated by filtration and the coffee was extracted with an additional 12.5 l. of ethylene dichloride, again allowing the mixture to stand over night. After filtration of the second extract and combining it with the first extract a total volume of 27 l. was obtained.

Other conditions of extraction and other solvents for the fat may also be employed, as for example, the solvent may be heated to reflux temperatures and/or the coffee may be slurried by means of a mechanical agitator. Other solvents that may be employed are the hydrocarbons such as benzene, toluene, hexane, heptane, octane and the chlorinated hydrocarbons such as trichlorethylene, carbon tetrachloride, methylene chloride, propylene dichloride, butyl chloride and the like.

The solvent remaining in the coffee was removed by steam distillation and collected to recover 12 l. of solvent and a coffee infusion was prepared by adding a total of 165 lbs. of boiling water. After about 10 minutes the infusion was separated from the coffee grounds by filtration and concentrated to a volume of about 6.0 l. preparatory to spray drying.

The aforementioned 27.0 l. solvent extract was concentrated by distillation under reduced pressure, using nitrogen for ebullition purposes, to remove substantially all of the ethylene dichloride. To remove the last traces of solvent the residual oil was heated on a steam bath for 24 hours, bubbling nitrogen through the oil to obtain about 2.4 lbs. of a solvent-free mixture of coffee fat and aroma. In removing the solvent as described above there is no detectable loss of aroma as indicated by the odor of the distilled solvent and the strong aromatic coffee odor of the residual oil. The complete separation between aroma fraction and fat solvent obtained as above described would not be expected in view of the volatility of the constituents of the aroma fraction. Apparently, the volatile constituents of the aroma fraction are combined in some manner with the coffee fat so that their volatility is reduced.

If desired, especially in the case of the more volatile solvents, the solvent removal may be carried out without resorting to the use of reduced pressure, but this usually necessitates a longer period of time and the use of higher temperatures. The use of an inert gas such as nitrogen for ebullition purposes while not imperative, is desirable, nevertheless, since it minimizes the deterioration of the aroma fraction and/or the fat. Also advantage may be gained by the incorporation of a suitable edible antioxidant in the residue remaining after the removal of the bulk of the solvent especially if air is to be used for sweeping or ebullition purposes. Such antioxidants may be any known to the art, highly suitable ones being caffeic acid, ethyl caffeate, nor-dihydroguiuretic acid, gum guaiac and the like.

The aforementioned residual oil was then treated to separate the aroma fraction from the fat by distillation from a falling film, the hot or distilling wall being maintained at a temperature of about 125° C., the cold or condensing wall being at about room temperature, and a reduced pressure of about 1.0 mm. being provided. The aroma fraction so separated amounted to 0.43 lb. and had a strong coffee flavor and odor without any off-flavor or odor. The aroma fraction was then combined with the aforementioned 6.0 l. concentrated infusion and the whole was spray dried to provide about 5.5 lbs. of a full-bodied instant coffee powder.

Instead of incorporating the aroma fraction in an instant coffee powder it is also possible to use said fraction for other flavoring purposes, as for example, in ice cream, icings, confectioneries, syrups and the like. Also, if desired, an antioxidant may be incorporated in the aroma fraction to advantage whether said fraction is incorporated in the instant coffee powder or used for the other flavoring purposes aforementioned. Suitable antioxidants for this purpose are any of the well known, edible antioxidants such as those aforementioned.

Instead of distilling the aroma fraction from the coffee fat by falling film distillation as described above, the separation may also be effected by the more conventional vacuum distillation. For example, about 2.0 lbs. of a solvent-free mixture of coffee fat and aroma provided by procedures such as those described above were heated at pot temperatures of 213°–326° C. and, at head temperatures of 132°–206° C. under a pressure of 0.25 mm., 0.25 lb. of aroma fraction were obtained. This material was inferior in many respects to the film distilled material aforementioned having a sweet, slightly stale, slightly sulfurous, slightly green taste which carried over into cup coffee in which it was tested. However, it had a definite coffee character and to this extent it enhanced the cup coffee to which it was added.

While the present invention has been described with reference to specific examples, it is to be understood that such has been done solely for the purpose of affording a more complete and thorough understanding of the practice of the invention and not for the purpose of limiting or restricting the scope thereof, reference being had for this purpose to the appended claims.

What is claimed is:

1. A process of preparing a defatted, dry soluble coffee product containing aromatic constituents of roasted coffee with their characteristic flavor and aroma substantially unaltered which comprises extracting ground roasted coffee with a volatile organic solvent and distilling said solvent to provide a residue containing said aromatic constituents combined with coffee fat, preparing an aqueous infusion of the defatted and dearomatized coffee and drying the infusion to provide a dry soluble coffee product, separating said aromatic constituents from said fat by distilling said residue under reduced pressure, and collecting and incorporating the separated aromatic constituents in said product.

2. A process as defined in claim 1, wherein an edible antioxidant is added to the separated aromatic constituents before they are incorporated in said product.

3. A process as defined in claim 1, wherein said aromatic constituents are separated from said fat by distilling a film of said residue under reduced pressure.

4. A process as defined in claim 3, wherein said film is distilled at a temperature within the range of 80°–150° C. at a pressure of less than 2.0 mm.

5. A process as defined in claim 4 wherein said solvent is a hydrocarbon solvent.

6. A process as defined in claim 5, wherein an edible antioxidant is added to the separated aromatic constituents before they are incorporated in said product.

7. A process as defined in claim 6, wherein said infusion is concentrated, the separated aromatic constituents and antioxidant are added to the concentrated infusion, and the resulting mixture is spray dried to provide said dry soluble product.

8. A process for producing a fat-free coffee extract containing aromatic constituents of roasted coffee with their characteristic flavor and aroma substantially unaltered which comprises extracting ground roasted coffee with a volatile organic solvent and distilling said solvent to provide a residue containing said aromatic constituents combined with coffee fat, and separating said aromatic constituents from said fat by distilling said residue under reduced pressure.

9. A process as defined in claim 8, wherein said aromatic constituents are separated from said fat by distilling a film of said residue under reduced pressure.

10. A process as defined in claim 9, said solvent being a hydrocarbon solvent.

11. A process as defined in claim 10, wherein said film is distilled at a temperature within the range of about 80°–150° C. and at a pressure of less than 2.0 mm.

HUBERT M. COLE.

REFERENCES CITED

The following references are of record in the file of this patent:

UNITED STATES PATENTS

| Number | Name | Date |
|---|---|---|
| 1,137,265 | Hubner | Apr. 27, 1913 |
| 1,175,490 | Von Vietinghoff | Mar. 14, 1916 |
| 2,481,470 | Cohen | Sept. 6, 1949 |

FOREIGN PATENTS

| Number | Country | Date |
|---|---|---|
| 389,192 | Canada | June 4, 1940 |

OTHER REFERENCES

Journal of the Society of Chemical Industry, Feb. 1939, pp. 39 and 44.

Johnston et al.: J. of Amer. Chem. Soc., vol. 60, pp. 1624–1627.